Patented July 10, 1928.

1,676,997

UNITED STATES PATENT OFFICE.

CONSTANTINE LEVENTIS, OF PHOENIX, ARIZONA.

ANTITUBERCULAR SERUM AND METHOD OF PRODUCING THE SAME.

No Drawing. Application filed April 28, 1928. Serial No. 273,772.

This invention relates to antitoxins and serums and has for its object the provision of certain improvements in antitoxins and serums. More particularly, the invention aims to provide an improved antitubercular antitoxin and serum and methods of producing the same. The invention further aims to provide antitoxins and antibacterial serums or antibodies in a form more suitable for medical use as a means to prevent the manifestation of the disease in the human body organism, after infection, and protect also the body organism against the further offensive action of the infectious germs after manifestation of the disease, and thus producing cure.

In the heretofore customary manner of producing antitoxins and antibacterial serums for medical use, animals are injected with specific toxins, antigens or specific infectious germs in such a manner that the blood of the animal gradually builds up a resistance to the specific toxin or infectious germ with which it has been injected. After a sufficient number of suitable injections the blood of the animal becomes so resistant that the animal becomes immune to that specific toxin or infectious germ. When the animals are thoroughly immunized they are bled and their serum is taken for medical use. A great variety of antitoxins and antibacterial serums are made in substantially the above described manner such, for instance, as diphtheria antitoxin, antipneumococcus serum and the like.

Studying in general the serotherapy against all infectious diseases and observing the results obtained with serotherapy, I came to the conclusion that antitoxins and antibacterial serums do not destroy the infectious germs in the body organism but disintoxicate the body organism of their toxins and protect the body organism against the further offensive action of the infectious germs by supplying the body organism with protective substances. The body organism is often unable to produce these protective substances by itself and check thus the further rapid multiplication of the infectious germs.

In considering why it has heretofore been possible to accomplish protection of the body organism, by means of antitoxins and antibacterial serums, against some infectious germs and impossible to accomplish that protection against other infectious germs notably pneumococci of all four types and tuberculosis, I came to the following conclusion:

The body organisms of the different animals, including the human organism, react in a different way when infected by the same infectious germs. The common tendency is to form within the organism, and usually in the blood, protective substances against the infectious germs. Many organisms perform that protection easily, while others cannot succeed to protect themselves. The same infectious germs when introduced into different body organisms act in different manners to increase and multiply. They become more virulent or attenuated according to the body organism, culture medium, in which they find themselves. Thus, in order that two different body organisms, infected with the same specific germs should produce the same protective substances they must first somehow become similar as culture media for the infectious germs. Then, under these conditions, antitoxins or antibacterial serums, from either of the two different body organisms, will act as protective substances when applied to the other of the two species of different body organisms which has been selected.

As an illustration of this, if we wish to protect a rabbit, against the infection of a specific germ, with serum taken from a goat immunized with the same specific germ, we must first link together the body organisms of both animals. That is, we must inject the body organism of the immunized goat with serum taken from the rabbit. Then, the body organism of the goat will not only provide protective substances, effective against the infectious germ, in relation to goats, as a class, but the goat body organism will, at the same time, provide protective substances effective against the infectious germ in relation to rabbits, as a class. With serum thus produced, the rabbit may be protected against the infection of a specific germ with serum taken from the goat.

I have discovered that, in a similar manner, antitoxins and antibacterial serums may be made from the blood of the lower animals which are effective to protect the human organism against the infection of specific germs. This is effected by suitably injecting the immunized or antigen treated lower animal with human serum and then preparing the antitoxin substance or antibacterial serum from the blood of the so treated lower animal. Thus, if it is desired to produce humanized serum, from the donkey, effective against tuberculosis in the human organism, the donkey, immunized against tuberculosis, must be injected with human serum, a process which prior to the present invention has never been used. A serum may thus be produced which will be effective to protect the human organism against tuberculosis.

Prior to my invention attempts were made to prepare antibacterial serum against tuberculosis but without any success. In order that the invention may be better understood the following specific example of the preparation of serum is given:

*Preparation of antituberculosis serum.*

The animals, preferably donkeys, are previously tested with tuberculin and mallein. The first injections are with very attenuated killed tubercle bacilli in suspension and are made subcutaneously. The first doses are small, in the neighborhood of 100,000,000 of the very attenuated or killed bacilli. Progressively the dose is increased until it reaches five billions, avoiding in this way any severe reaction.

Then starting with half of the former dose, or substantially 50,000,000 of the very attenuated or killed tubercle bacilli, intravenous injections are made. This dose is progressively increased in subsequent injections until the dose is increased to five billions. The animal is then injected intravenously with one billion of the very attenuated or dead tubercle bacilli in suspension together with 10 cc. of human serum. This brings on a very severe reaction, lasting frequently for a week. In this reaction the animal shivers with high temperature of from 102 to 104 degrees.

The animals are allowed to rest for 20 days and then subcutaneously injected with one cc. of sputum of a tubercular patient suffering from a very active tuberculosis. The sputum must show at least 25 tubercle bacilli in each field. In the place of the injection of the sputum there is formed an abscess with a large area of inflammation. The animal becomes sick with temperature and loss of appetite. This condition continues for a week or twelve days, when the abscess is broken and inflammation and temperature subside. It takes two to three months for the tubercular abscess to heal completely and for the animal to increase in weight.

The animal is then allowed to rest for another month to recover completely from the infection. Ten to twenty cc. of human serum are then injected intravenously which produces severe reaction with symptoms of anaphylaxia. The seventh day after the injection of the human serum the animal is bled and the serum taken.

To each 100 cc. of the serum so produced are added, as a preservative, 20 cc. of a 2% solution of tricresol. This mixture is kept in a refrigerator for at least three months. The serum is then tested on guinea pigs for sterility and toxicity, and, if, found satisfactory, is refined and made ready for medical use. While the use of tricresol is specifically described by way of example, other preservatives such as phenol or chloroform may be employed. The preparation of the serum as herein described requires a period of at least eight to ten months.

The therapeutic dose in adults is ten drops injected subcutaneously and is repeated at intervals of seven days until a total of three injections have been made. After an interval of twenty days two or three more injections are made, again at intervals of seven days. The number of these second injections is governed according to the slight local reaction, which consists in redness and itching. The administration of the doses is accomplished without any systematic disturbance of the organism and without disturbing the welfare of the patient. After the two preliminary series of injections, the injections are continued, as above at intervals of two months until satisfactory results are obtained.

While I have described certain methods by which humanized serums may be made, I do not wish to confine myself to these specific methods, nor do I wish to confine myself to the preparation of the specific substances named. The methods may be varied or changed in any way which may seem advisable to suit existing conditions, without departing from the spirit of the invention. While I have described methods in which dead, attenuated or living bacteria were used, I do not wish to thus confine myself, but, may instead, make use of toxins given off by the living bacteria or liquid extracts from cultures, disintegrated micro-organisms or disintegrated products of the bacterial cells or even certain micro-organisms or their products which are not associated in any way with the production of the specific affection.

I claim:

1. In the process of preparing tubercular antitoxins and serums, treating an animal with tubercular antigen, injecting serum from an animal to be protected and of a different species into said treated animal and withdrawing the serum from the treated animal.

2. In the process of preparing tubercular antitoxins and serums for specific animal use, injecting an animal of a species other than the specific animal with tuberculosis toxin or bacterial extract, injecting the animal with the specific animal serum and withdrawing the serum from the treated animal.

3. In the process of preparing tubercular antitoxins and serums for human use, treating an animal with a tuberculosis antigen, injecting human serum into the said treated animal and withdrawing serum from the thus treated animal.

4. In the process of preparing tuberculosis antitoxins and serums, treating an animal not normally responsive to tuberculosis with tuberculosis antigen, injecting into the said treated animal serum from an animal normally responsive to tuberculosis thereby making the said treated animal responsive to tuberculosis, and withdrawing serum from the thus treated animal.

5. An anti-tubercular serum derived from the blood of an animal which is not normally responsive to tuberculosis, but which has been made responsive by injection with tuberculosis antigen and serum of a responsive animal.

In testimony whereof I affix my signature.

CONSTANTINE LEVENTIS, M. D.